United States Patent
Kishimoto et al.

(10) Patent No.: US 8,999,874 B2
(45) Date of Patent: Apr. 7, 2015

(54) CARBON CATALYST AND PROCESS FOR PRODUCTION THEREOF, AND ELECTRODE AND BATTERY EACH EQUIPPED WITH SAME

(75) Inventors: Takeaki Kishimoto, Funabashi (JP); Mayumi Mizushiri, Chiba (JP); Jun-ichi Ozaki, Kiryu (JP); Yusuke Sudo, Kanonii (JP); Naokatsu Kannari, Kiryu (JP)

(73) Assignees: National University Corporation Gunma University, Gunma (JP); Nisshinbo Holdings Inc., Tokyo (JP)

( * ) Notice: Subject to any disclaimer, the term of this patent is extended or adjusted under 35 U.S.C. 154(b) by 0 days.

(21) Appl. No.: 13/881,456

(22) PCT Filed: Nov. 1, 2011

(86) PCT No.: PCT/JP2011/075187
§ 371 (c)(1),
(2), (4) Date: Apr. 25, 2013

(87) PCT Pub. No.: WO2012/063681
PCT Pub. Date: May 18, 2012

(65) Prior Publication Data
US 2013/0217567 A1    Aug. 22, 2013

(30) Foreign Application Priority Data
Nov. 8, 2010    (JP) .................................. 2010-250270

(51) Int. Cl.
*H01M 4/13*    (2010.01)
*H01M 4/133*    (2010.01)
(Continued)

(52) U.S. Cl.
CPC .............. *H01M 4/9041* (2013.01); *Y02E 60/50* (2013.01); *H01M 4/96* (2013.01); *H01M 2008/1095* (2013.01)

(58) Field of Classification Search
None
See application file for complete search history.

(56) References Cited

U.S. PATENT DOCUMENTS 2,615,932 A * 10/1952 Marko et al. ...................... 429/5
4,011,374 A    3/1977 Kaun
(Continued)

FOREIGN PATENT DOCUMENTS

| CA | 2642226 A1 | 8/2007 |
|---|---|---|
| CA | 2725738 A1 | 12/2009 |

(Continued)

OTHER PUBLICATIONS

Sep. 24, 2013 Korean Office Action issued in Korean Patent Application No. 10-2013-7011106 (with partial English Translation).
(Continued)

*Primary Examiner* — Guinever Gregorio
(74) *Attorney, Agent, or Firm* — Oliff PLC

(57) ABSTRACT

Provided is a carbon catalyst having an improved catalytic activity, a production method therefor, and an electrode and a battery which use the carbon catalyst. The carbon catalyst is obtained by carbonizing a raw material including an organic substance containing a nitrogen atom and metals, and includes iron and/or cobalt, and copper as the metals. Further, the carbon catalyst has a crystallinity of 41.0% or less, which is determined by X-ray diffractometry, a nitrogen atom-to-carbon atom ratio of 0.7 or more, which is determined by X-ray photoelectronic spectrometry, and an oxygen reduction-starting potential of 0.774 V (vs. NHE) or more.

11 Claims, 5 Drawing Sheets

(51) Int. Cl.
*H01M 4/1393* (2010.01)
*H01M 4/88* (2006.01)
*B01J 29/00* (2006.01)
*B01J 21/18* (2006.01)
*B01J 23/40* (2006.01)
*H01M 4/90* (2006.01)
*H01M 4/96* (2006.01)
*H01M 8/10* (2006.01)

(56) References Cited

U.S. PATENT DOCUMENTS

| 7,517,606 B2* | 4/2009 | Kodas et al. | 429/483 |
| 2003/0175580 A1 | 9/2003 | Ozaki et al. | |
| 2005/0084441 A1 | 4/2005 | Xu et al. | |
| 2011/0136036 A1* | 6/2011 | Miyata et al. | 429/479 |

FOREIGN PATENT DOCUMENTS

| DE | 31 19 707 A1 | 12/1982 |
| JP | A-2003-249231 | 9/2003 |
| JP | A-2005-63677 | 3/2005 |
| JP | A-2007-207662 | 8/2007 |
| JP | A-2008-282725 | 11/2008 |
| JP | A-2009-291706 | 12/2009 |
| JP | A-2010-201416 | 9/2010 |
| WO | WO 03/033140 A2 | 4/2003 |

OTHER PUBLICATIONS

Jan. 31, 2012 International Search Report issued in PCT/JP2011/075187 (with translation).
Jan. 31, 2012 Written Opinion issued in PCT/JP2011/075187 (with translation).
May 14, 2013 International Preliminary Report on Patentability issued in PCT/JP2011/075187 (with translation).
Aug. 24, 2012 Japanese Office Action issued in Japanese Patent Application No. 2010-250270 (with partial translation).
Canadian Patent Office, Office Action dated Jul. 12, 2013 in Canadian Patent Application No. 2,817,237.
Dec. 26, 2013 Chinese Office Action issued in Chinese Patent Application No. 201180053814.6 (with English-language Translation).
Feb. 7, 2014 Canadian Office Action issued in Canadian Patent Application No. 2,817,237.
Jul. 1, 2014 Extended European Search Report issued in Application No. 11839356.0.
Jul. 24, 2014 Office Action issued in Chinese Application No. 201180053814.6 (with English Translation).
Sep. 18, 2014 Office Action issued in Canadian Patent Application No. 2,817,237, 2014.

* cited by examiner

FIG. 1

| CARBON CATALYST | RATIO OF METAL (wt%) | | CONTENT OF METAL (wt%) | | | | OXYGEN REDUCTION-STARTING POTENTIAL (V vs. NHE) | CURRENT DENSITY (mA/cm²) | CRYSTALLINITY (%) | N/C RATIO (—) |
|---|---|---|---|---|---|---|---|---|---|---|
| | Fe | Cu | TOTAL | Fe | Cu | ANOTHER METAL | | | | |
| Fe100/Cu0 | 100 | 0 | 5 | 5 | 0 | 0 | 0.755 | −0.045 | 41.33 | 0.86 |
| Fe75/Cu25 | 75 | 25 | 5 | 3.75 | 1.25 | 0 | 0.798 | −0.144 | 40.82 | 1.50 |
| Fe50/Cu50 | 50 | 50 | 5 | 2.5 | 2.5 | 0 | 0.821 | −0.243 | 32.34 | 0.79 |
| Fe35/Cu65 | 35 | 65 | 5 | 1.75 | 3.25 | 0 | 0.830 | −0.355 | 24.06 | 1.49 |
| Fe25/Cu75 | 25 | 75 | 5 | 1.25 | 3.75 | 0 | 0.819 | −0.281 | 9.24 | 4.20 |
| Fe15/Cu85 | 15 | 85 | 5 | 0.75 | 4.25 | 0 | 0.824 | −0.390 | 6.49 | 3.44 |
| Fe0/Cu100 | 0 | 100 | 5 | 0 | 5 | 0 | 0.630 | −0.003 | 4.52 | 5.80 |
| Fe25/Cu75(C900) | 25 | 75 | 5 | 1.25 | 3.75 | 0 | 0.803 | −0.146 | 17.98 | 2.51 |
| Fe25/Cu75(C1000) | 25 | 75 | 5 | 1.25 | 3.75 | 0 | 0.792 | −0.097 | 18.53 | 2.51 |
| Fe25/Cu75(10) | 25 | 75 | 10 | 2.5 | 7.5 | 0 | 0.832 | −0.293 | 8.49 | 5.24 |
| Fe25/Cu75(15) | 25 | 75 | 15 | 3.75 | 11.25 | 0 | 0.818 | −0.246 | 8.76 | 4.35 |
| Fe23/Cu69/Co8 | 23 | 69 | 5 | 1.15 | 3.45 | 0.4 | 0.789 | −0.154 | — | — |
| Fe75/Ni25 | 75 | 0 | 5 | 3.75 | 0 | 1.25 | 0.746 | −0.032 | — | — |
| Fe25/Ni75 | 25 | 0 | 5 | 1.25 | 0 | 3.75 | 0.717 | −0.017 | — | — |
| Fe0/Ni100 | 0 | 0 | 5 | 0 | 0 | 5 | 0.620 | −0.001 | — | — |
| Fe75/Mn25 | 75 | 0 | 5 | 3.75 | 0 | 1.25 | 0.712 | −0.013 | — | — |
| Fe25/Mn75 | 25 | 0 | 5 | 1.25 | 0 | 3.75 | 0.650 | −0.004 | — | — |
| Fe0/Mn100 | 0 | 0 | 5 | 0 | 0 | 5 | 0.713 | −0.013 | — | — |

FIG.2

| CARBON CATALYST | RATIO OF METAL(wt%) | | | | CONTENT OF METAL(wt%) | | | | | OXYGEN REDUCTION-STARTING POTENTIAL (V vs. NHE) | CURRENT DENSITY (mA/cm²) | CRYSTALLINITY (%) | N/C RATIO (-) |
|---|---|---|---|---|---|---|---|---|---|---|---|---|---|
| | Fe | Co | Cu | ANOTHER METAL | TOTAL | Fe | Co | Cu | ANOTHER METAL | | | | |
| Fe100/Cu0(H) | 100 | 0 | 0 | 0 | 5 | 5 | 0 | 0 | 0 | 0.764 | -0.045 | 44.08 | 0.84 |
| Fe75/Cu25(H) | 75 | 0 | 25 | 0 | 5 | 3.75 | 0 | 1.25 | 0 | 0.798 | -0.144 | 33.44 | 1.72 |
| Fe50/Cu50(H) | 50 | 0 | 50 | 0 | 5 | 2.5 | 0 | 2.5 | 0 | 0.804 | -0.243 | 34.26 | 1.30 |
| Fe35/Cu65(H) | 35 | 0 | 65 | 0 | 5 | 1.75 | 0 | 3.25 | 0 | 0.826 | -0.355 | 25.06 | 2.43 |
| Fe25/Cu75(H) | 25 | 0 | 75 | 0 | 5 | 1.25 | 0 | 3.75 | 0 | 0.834 | -0.281 | 9.82 | 4.16 |
| Fe15/Cu85(H) | 15 | 0 | 85 | 0 | 5 | 0.75 | 0 | 4.25 | 0 | 0.823 | -0.390 | 5.05 | 4.85 |
| Fe0/Cu100(H) | 0 | 0 | 100 | 0 | 5 | 0 | 0 | 5 | 0 | 0.692 | -0.003 | 0.00 | 4.90 |
| Fe25/Cu75(C900)(H) | 25 | 0 | 75 | 0 | 5 | 1.25 | 0 | 3.75 | 0 | 0.812 | -0.146 | 20.32 | 3.00 |
| Fe25/Cu75(C1000)(H) | 25 | 0 | 75 | 0 | 5 | 1.25 | 0 | 3.75 | 0 | 0.810 | -0.097 | 21.37 | 2.78 |
| Fe25/Cu75(10)(H) | 25 | 0 | 75 | 0 | 10 | 2.5 | 0 | 7.5 | 0 | 0.829 | -0.293 | 9.08 | 6.34 |
| Fe25/Cu75(15)(H) | 25 | 0 | 75 | 0 | 15 | 3.75 | 0 | 11.25 | 0 | 0.821 | -0.246 | 9.50 | 6.19 |
| Fe100/Cu0(1.25)(H) | 100 | 0 | 0 | 0 | 1.25 | 1.25 | 0 | 0 | 0 | 0.773 | -0.097 | 36.84 | 1.24 |
| Fe23/Cu69/Co8(H) | 23 | 0 | 69 | 8 | 5 | 1.15 | 0 | 3.45 | 0.4 | 0.808 | -0.290 | 12.65 | 4.78 |
| Fe100/Cu0(H)(N) | 100 | 0 | 0 | 0 | 5 | 5 | 0 | 0 | 0 | 0.776 | -0.093 | 46.17 | 2.74 |
| Fe75/Cu25(H)(N) | 75 | 0 | 25 | 0 | 5 | 3.75 | 0 | 1.25 | 0 | 0.801 | -0.230 | 36.79 | 2.88 |
| Co100/Cu0(H) | 0 | 100 | 0 | 0 | 5 | 0 | 5 | 0 | 0 | 0.765 | -0.089 | 19.01 | 4.55 |
| Co75/Cu25(H) | 0 | 75 | 25 | 0 | 5 | 0 | 3.75 | 1.25 | 0 | 0.774 | -0.143 | 14.22 | 5.75 |
| Co25/Cu75(H) | 0 | 25 | 75 | 0 | 5 | 0 | 1.25 | 3.75 | 0 | 0.784 | -0.203 | 18.87 | 5.87 |
| Fe25/Ni75(H) | 25 | 0 | 0 | 75 | 5 | 1.25 | 0 | 0 | 3.75 | 0.709 | -0.013 | 25.91 | 2.03 |
| Fe0/Ni100(H) | 0 | 0 | 0 | 100 | 5 | 0 | 0 | 0 | 5 | 0.679 | -0.006 | 24.32 | 2.39 |
| Fe25/Mn75(H) | 25 | 0 | 0 | 75 | 5 | 1.25 | 0 | 0 | 3.75 | 0.739 | -0.032 | 38.40 | 0.92 |
| Fe0/Mn100(H) | 0 | 0 | 0 | 100 | 5 | 0 | 0 | 0 | 5 | 0.715 | -0.014 | 20.47 | 2.14 |

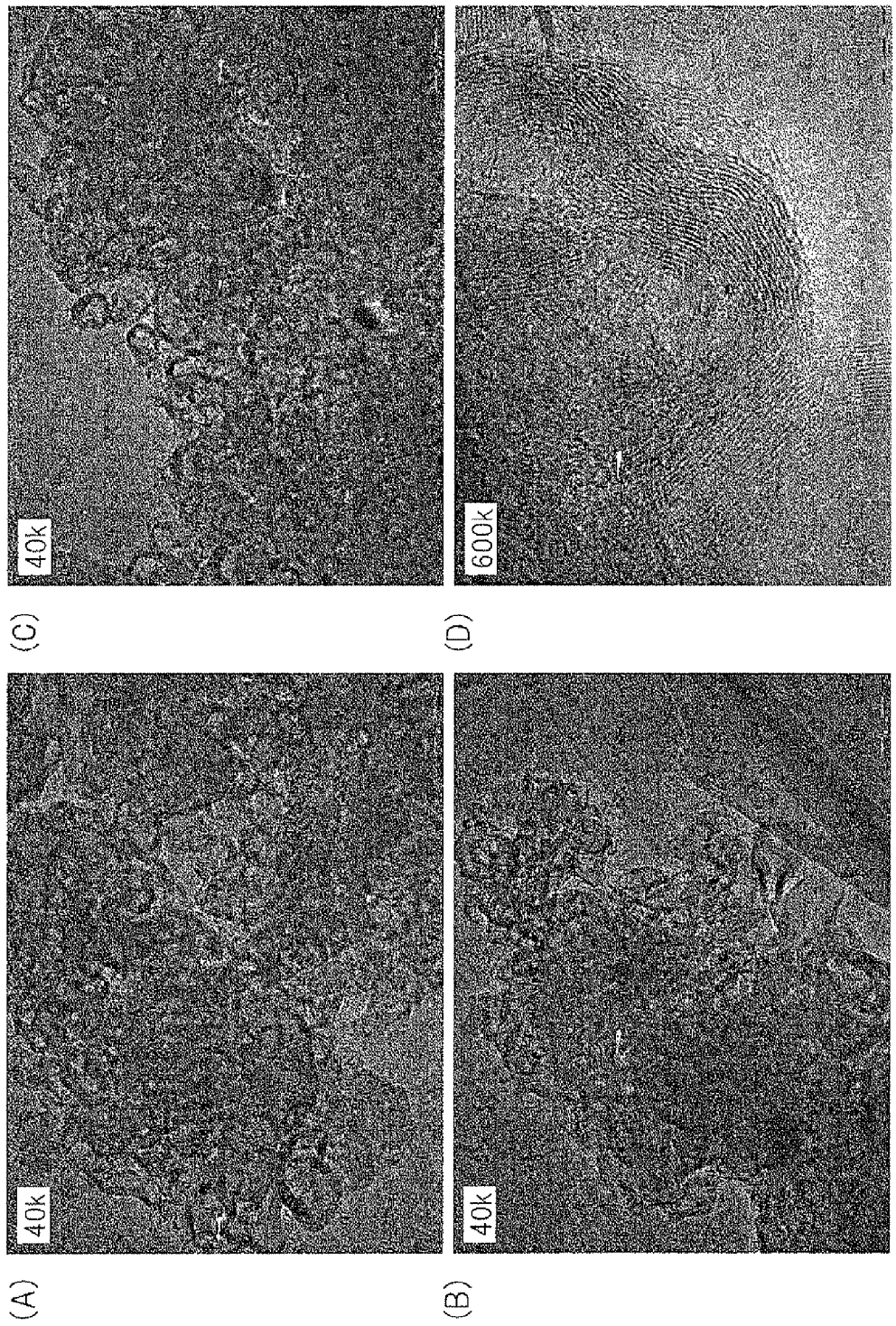

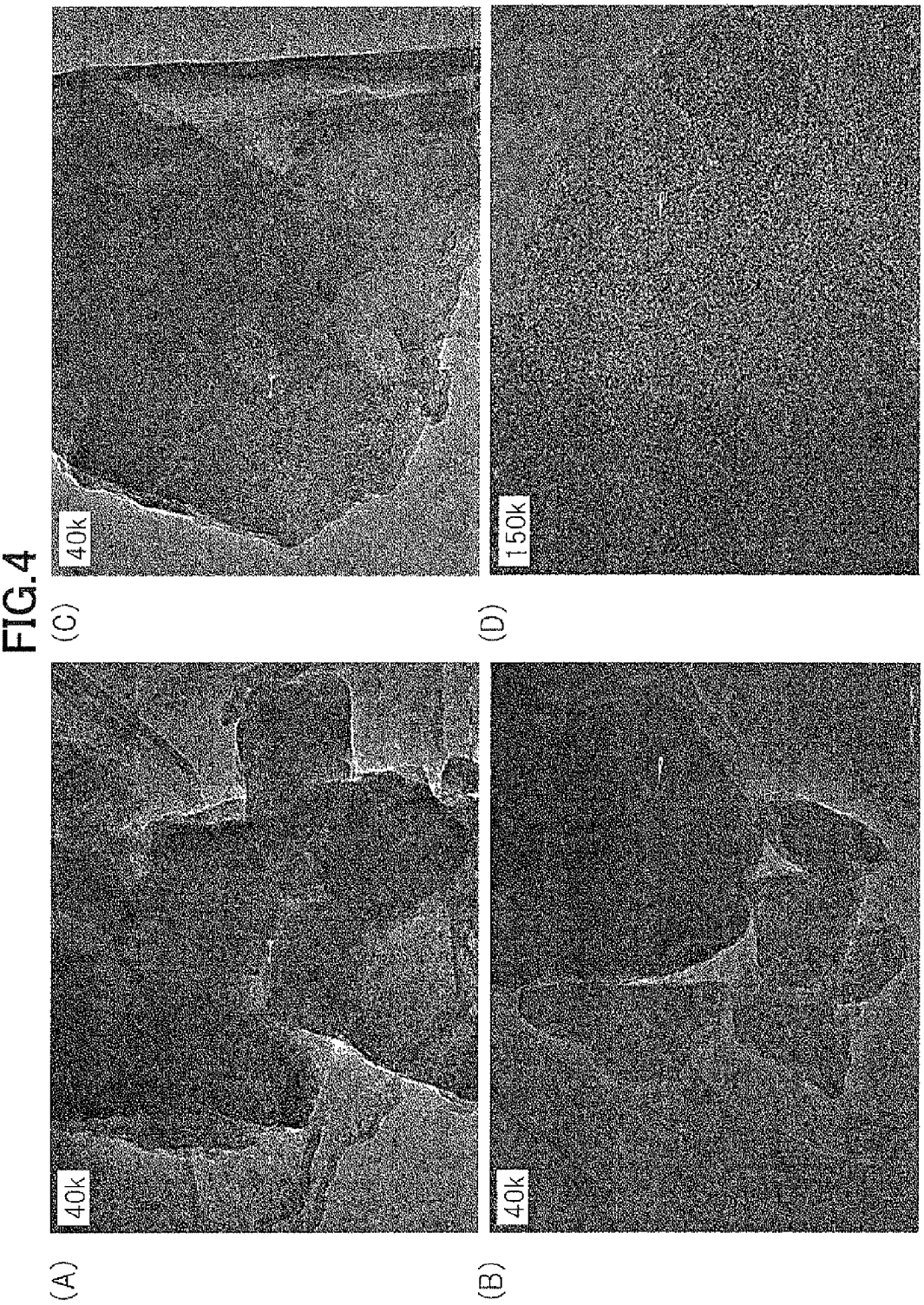

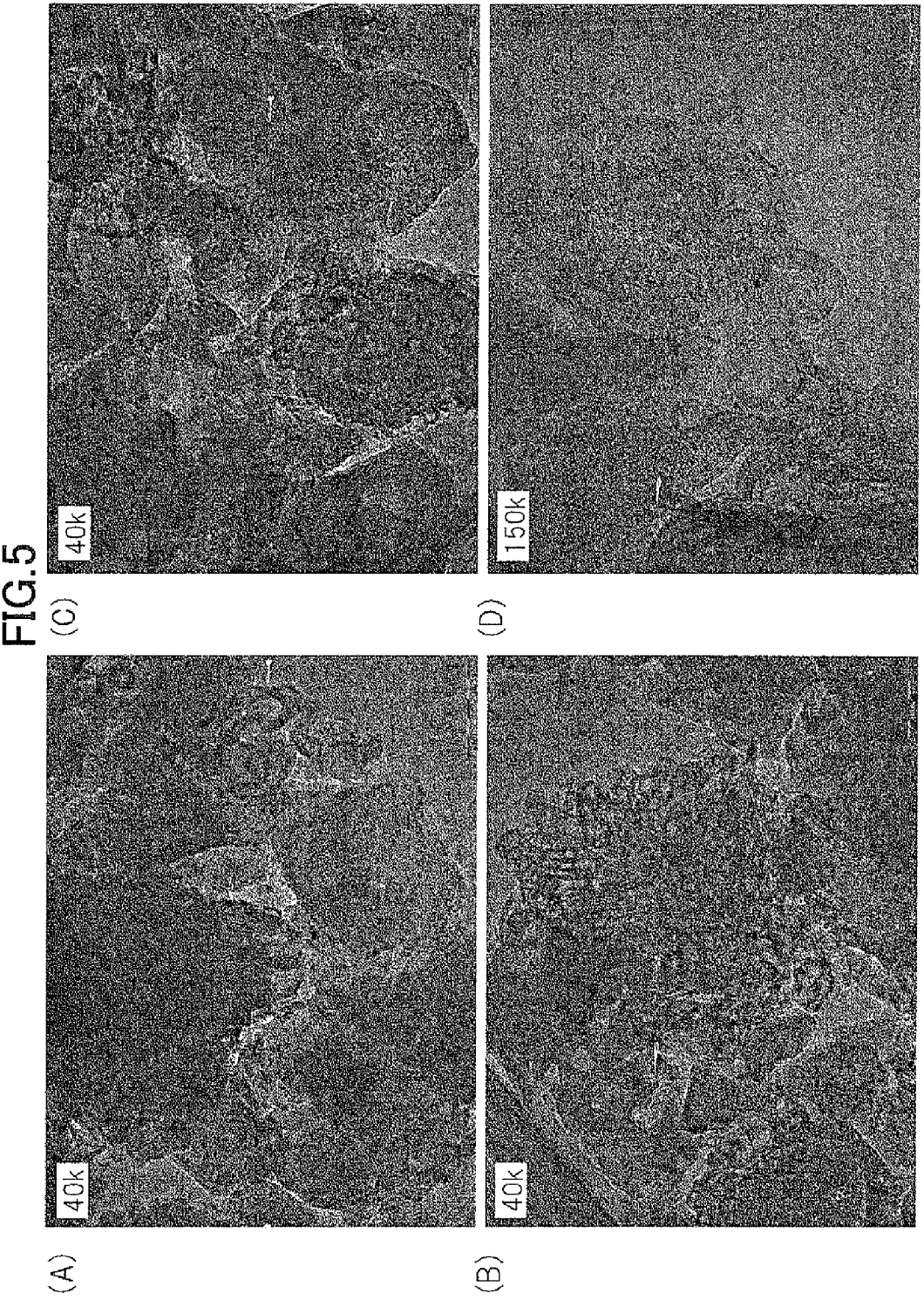

CARBON CATALYST AND PROCESS FOR PRODUCTION THEREOF, AND ELECTRODE AND BATTERY EACH EQUIPPED WITH SAME

TECHNICAL FIELD

The present invention relates to a carbon catalyst, a production method thereof, and an electrode and a battery which use the carbon catalyst, and more particularly, to an improvement of catalytic activity of the carbon catalyst.

BACKGROUND ART

At present, a platinum catalyst is used in many chemical reactions and next-generation batteries. However, there are many problems to be solved, such as limited platinum reserves, an increase in cost due to use of platinum in a polymer electrolyte fuel cell (PEFC), and occurrence of a chemical reaction such as decomposition of an electrolyte solution by platinum, as well as an increase in cost due to use of platinum in an air cell. Therefore, an alternative technology which does not use platinum has been developed.

That is, hitherto, for example, Patent Literature 1 proposes a fuel cell using, as an electrode catalyst, a metal oxide such as ruthenium oxide, titanium oxide, vanadium oxide, manganese oxide, cobalt oxide, nickel oxide, or tungsten oxide or a metal nitride such as molybdenum nitride.

In addition, Patent Literature 2 proposes a carbon catalyst for a fuel cell, which is obtained by: adding a metal compound containing at least one of iron, cobalt, nickel, chromium, and manganese to a raw material for producing non-graphitizable carbon; mixing the components; and performing a carbonization treatment by firing, and has a carbon nano-onion structure laminated and developed in an onion form around metal particles. Further, Patent Literature 3 proposes a carbon catalyst for a fuel cell, which has a nanosized shell-like structure as disclosed in Patent Literature 2 and is doped with nitrogen by a liquid-phase doping method or a gas-phase doping method.

CITATION LIST

Patent Literature

[PTL 1] JP 2005-63677 A
[PTL 2] JP 2003-249231 A
[PTL 3] JP 2007-207662 A

SUMMARY OF INVENTION

Technical Problem

However, the electrode catalyst using the metal oxide or the metal nitride proposed in Patent Literature 1 has a problem in that the catalytic activity is low. In addition, each of the carbon catalysts proposed in Patent Literatures 2 and 3 has a relatively high but insufficient catalytic activity. Further, in the cases of conventional carbon catalysts, it is difficult to appropriately control their structures necessary for their high catalytic activities.

That is, it is considered that, in order to achieve a high catalytic activity of a carbon catalyst having a nanosized shell-like structure, development of the shell-like structure alone is insufficient. For example, excessive development of the shell-like structure of the carbon catalyst causes a decrease in the catalytic activity (for example, oxygen reduction catalytic activity). The decrease in the catalytic activity is probably caused as follows, for example. In production of a carbon catalyst by carbonization of a raw material including an organic substance and a metal, metal clusters are formed in the raw material at a relatively low temperature, and the metal clusters are aggregated until the temperature reaches a carbonization temperature in carbonization of the raw material. As a result, a size of the shell-like structure formed by the carbonization around the aggregated metal clusters increases excessively, and surface defects of the carbon structure which contributes to the catalytic activity disappear.

Meanwhile, in order to achieve a high catalytic activity by the carbon catalyst, it is considered to be important that the carbon catalyst contain nitrogen atoms in an appropriate amount. In this connection, hitherto, cobalt or iron which is suitable for development of the shell-like structure has been preferably used as a metal in the raw material of the carbon catalyst, but development of the shell-like structure including cobalt or iron causes elimination of nitrogen atoms from the carbon catalyst. However, hitherto, in the carbon catalyst, it has been difficult to appropriately control a balance between a degree of development of the shell-like structure and a nitrogen atom content.

The present invention has been made in view of the above-mentioned problems, and an object of the present invention is to provide a carbon catalyst having an improved catalytic activity, a production method thereof, and an electrode and a battery which use the carbon catalyst.

Solution to Problems

In order to solve the above-mentioned problem, according to an exemplary embodiment of the present invention, there is provided a carbon catalyst, which is obtained by carbonizing a raw material including an organic substance containing a nitrogen atom and metals, the catalyst including iron and/or cobalt, and copper as the metals. According to the present invention, there is provided a carbon catalyst having an improved catalytic activity.

Further, in the carbon catalyst, a ratio of a content of copper, to a total of a content of iron and/or a content of cobalt, and the content of copper, may be 10 to 95% by mass. Further, the carbon catalyst may include at least iron and copper as the metals.

In order to solve the above-mentioned problem, according to another exemplary embodiment of the present invention, there is provided a carbon catalyst, having a crystallinity of 41.0% or less, which is determined by X-ray diffractometry, a nitrogen atom-to-carbon atom ratio of 0.7 or more, which is determined by X-ray photoelectronic spectrometry, and an oxygen reduction-starting potential of 0.774 V (vs. NHE) or more. According to the present invention, there is provided a carbon catalyst having an improved catalytic activity.

In order to solve the above-mentioned problem, according to another exemplary embodiment of the present invention, there is provided an electrode, including any one of the above-mentioned carbon catalysts. According to the present invention, there is provided an electrode including a carbon catalyst having an improved catalytic activity.

In order to solve the above-mentioned problem, according to another exemplary embodiment of the present invention, there is provided a battery, including the above-mentioned electrode. According to the present invention, there is provided a battery including an electrode including a carbon catalyst having an improved catalytic activity.

In order to solve the above-mentioned problem, according to another exemplary embodiment of the present invention, there is provided a method of producing a carbon catalyst, the method including carbonizing a raw material including an organic substance containing a nitrogen atom and metals, in which the metals include iron and/or cobalt, and copper. According to the present invention, there is provided a method of producing a carbon catalyst having an improved catalytic activity.

Further, in the method of producing a carbon catalyst, a ratio of a content of copper, to a total of a content of iron and/or a content of cobalt, and the content of copper in the raw material, may be 10 to 95% by mass. Further, in the method of producing a carbon catalyst, the metals may include at least iron and copper.

Advantageous Effects of Invention

According to the present invention, there is provided a carbon catalyst having an improved catalytic activity, a production method thereof, and an electrode and a battery which use the carbon catalyst.

BRIEF DESCRIPTION OF DRAWINGS

FIG. 1 An explanatory diagram showing examples of production conditions and characteristics of carbon catalysts obtained in Examples according to one embodiment of the present invention.

FIG. 2 An explanatory diagram showing other examples of production conditions and characteristics of carbon catalysts obtained in Examples according to one embodiment of the present invention.

FIG. 3 Examples of transmission electron micrographs of carbon catalysts obtained by using iron alone as a metal in Examples according to one embodiment of the present invention.

FIG. 4 Examples of transmission electron micrographs of carbon catalysts obtained by using copper alone as a metal in Examples according to one embodiment of the present invention.

FIG. 5 Examples of transmission electron micrographs of carbon catalysts obtained by using iron and copper as metals in Examples according to one embodiment of the present invention.

DESCRIPTION OF EMBODIMENTS

Hereinafter, one embodiment of the present invention will be described. It should be noted that the present invention is not limited to the examples shown in this embodiment.

As mentioned above, some conventional carbon catalysts have relatively high catalytic activities, but it is not easy to further improve the catalytic activities. In particular, it is difficult to appropriately control carbon catalyst structures which contribute to the catalytic activities.

The inventors of the present invention have made intensive studies to solve the above-mentioned problems, and as a result, have uniquely found that employment of a specific combination of iron and/or cobalt, and copper, appropriately control a balance between the degree of development of a carbon structure which contributes to a catalytic activity (for example, a nanosized shell-like structure) and the nitrogen atom content to effectively improve the catalytic activity of a carbon catalyst, thus completing the present invention.

First, a method of producing a carbon catalyst according to this embodiment (hereinafter referred to as "method of the present invention") will be described. The method of the present invention is a method of producing a carbon catalyst, including carbonizing a raw material including an organic substance containing a nitrogen atom and metals, in which the metals include iron and/or cobalt, and copper. That is, the method of the present invention includes a raw material preparation step of preparing a raw material to be carbonized and a carbonization step of carbonizing the raw material.

In the raw material preparation step, a raw material including an organic substance containing a nitrogen atom and metals including iron and/or cobalt, and copper is prepared. The organic substance containing a nitrogen atom is not particularly limited as long as the organic substance is carbonized and contains a nitrogen atom, and any one or more kinds of organic substance may be used.

That is, for example, an organic compound containing a nitrogen atom is preferably used. The organic compound containing a nitrogen atom is not particularly limited as long as the compound contains a nitrogen atom in its molecule. For example, one or both of a high-molecular-weight organic compound (for example, a resin such as a thermosetting resin or a thermoplastic resin) and a low-molecular-weight organic compound containing a nitrogen atom is used. In addition, a biomass may also be used.

For example, a ligand capable of coordinating to a metal may be preferably used as the organic compound. That is, in this case, an organic compound containing one or more kinds of ligand atom in its molecule is used. More specifically, for example, an organic compound containing, as the ligand atom, one or more kinds selected from the group consisting of a nitrogen atom, a phosphorus atom, an oxygen atom, and a sulfur atom may be used. In addition, for example, an organic compound containing, as a coordinating group, one or more kinds selected from the group consisting of an amino group, a phosphino group, a carboxyl group, and a thiol group in its molecule may be used.

In addition, an organic compound containing no nitrogen atom and an organic compound containing a nitrogen atom may be used in combination. That is, for example, a high-molecular-weight organic compound containing no nitrogen atom and a metal ligand containing a nitrogen atom ligand may be used.

For example, the organic substance may contain one or more kinds selected from the group consisting of a boron atom, a phosphorous atom, an oxygen atom, and a sulfur atom as a component for improving the activity of a carbon catalyst produced by the method of the present invention.

As the organic substance, for example, there may be used one or more kinds selected from the group consisting of a phenol resin, polyfurfuryl alcohol, furan, a furan resin, a phenol formaldehyde resin, melamine, a melamine resin, an epoxy resin, a chelate resin, a polyamide-imide resin, pyrrole, polypyrrole, polyvinylpyrrole, 3-methylpolypyrrole, acrylonitrile, polyacrylonitrile, a polyacrylonitrile-polymethacrylic acid copolymer, polyvinylidene chloride, thiophene, oxazole, thiazole, pyrazole, vinylpyridine, polyvinylpyridine, pyridazine, pyrimidine, piperazine, pyran, morpholine, imidazole, 1-methylimidazole, 2-methylimidazole, quinoxaline, aniline, polyaniline, succinic acid dihydrazide, adipic acid dihydrazide, polysulfone, polyaminobismaleimide, polyimide, polyvinyl alcohol, polyvinylbutyral, benzimidazole, polybenzimidazole, polyamide, polyester, polylactic acid, polyether, polyether ether ketone, cellulose, carboxymethylcellulose, lignin, chitin, chitosan, pitch, brown coal, silk, wool, polyamino acid, a nucleic acid, DNA, RNA, hydrazine, hydrazide, urea, salen, polycarbazole, polybismaleimide, triazine, polyacrylic acid, polyacrylic acid ester, polymethacrylic acid ester, polymethacrylic acid, polyurethane, polyamideamine, and polycarbodiimide.

As the metals, at least iron and/or cobalt, and copper are used. That is, the metals may include at least iron and copper, may include at least cobalt and copper, or may include iron, cobalt, and copper. In particular, the metals preferably include at least iron and copper from the standpoints of appropriately controlling a balance between the degree of development of a carbon structure which contributes to the catalytic activity (for example, a nanosized shell-like structure) and the nitrogen atom content, and effectively improving the catalytic activity of the carbon catalyst. It should be noted that in a case where the metals include at least iron and copper, the metals may further include cobalt, while in a case where the metals include at least cobalt and copper, the metals may further include iron.

The metals may further include any other metal. The other metal is not particularly limited as long as the metal does not inhibit the activity of a carbon catalyst produced by the method of the present invention, and any one or more kinds of metal may be used. For example, the other metal may be one or more kinds selected from the group consisting of metals belonging to Group 3 to Group 16 of the periodic table. That is, there may be used one or more kinds selected from the group consisting of Group 3A (Group 3) elements, Group 4A (Group 4) elements, Group 5A (Group 5) elements, Group 6A (Group 6) elements, Group 7A (Group 7) elements, Group 8 (Group 8, Group 9, and Group 10) elements, Group 1B (Group 11) elements, Group 2B (Group 12) elements, Group 3B (Group 13) elements, Group 4B (Group 14) elements, Group 5B (Group 15) elements, and Group 6B (Group 16) elements of the periodic table. Of those, a transition metal (Group 3 to Group 12 of the periodic table) may be preferably used, a transition metal belonging to the fourth period of Group 3 to Group 12 of the periodic table may be more preferably used.

Specifically, as the other metal, for example, there may be preferably used one or more kinds selected from the group consisting of scandium (Sc), titanium (Ti), vanadium (V), chromium (Cr), manganese (Mn), nickel (Ni), zinc (Zn), yttrium (Y), zirconium (Zr), niobium (Nb), molybdenum (Mo), ruthenium (Ru), rhodium (Rh), palladium (Pd), lanthanoids (such as cerium (Ce)), and actinoids.

The metal may be used as an elementary substance of the metal or a compound of the metal. As the metal compound, for example, there may be used a metal salt, a metal oxide, a metal hydroxide, a metal nitride, a metal sulfide, a metal carbide, or a metal complex. Of those, a metal salt, a metal oxide, a metal sulfide, or a metal complex is preferably used. It should be noted that when a ligand is used as the organic compound, a metal complex is formed in the raw material.

The total amount of metals to the amount of the raw material is not particularly limited as long as a carbon catalyst having a desired characteristic is obtained. For example, the amount may be 0.1 to 50% by mass, 0.5 to 25% by mass, or 1 to 15% by mass.

The ratio of a total of a content of iron and/or a content of cobalt, and a content of copper to a total amount of metals is not particularly limited. For example, the ratio may be 60% by mass or more (that is, 60% by mass to 100% by mass), preferably 70% by mass or more, more preferably 90% by mass or more, particularly preferably 95% by mass or more.

That is, for example, in a case of using at least iron and copper as the metals, the ratio of the total of the content of iron and the content of copper to the total amount of the metals is 60% by mass or more (that is, 60% by mass to 100% by mass), preferably 70% by mass or more, more preferably 90% by mass or more, and particularly preferably 95% by mass or more.

A ratio of iron and/or cobalt to copper is not particularly limited as long as a carbon catalyst having a desired characteristic is obtained. For example, the ratio of the content of copper to the total of the content of iron and/or the content of cobalt, and the content of copper, may be 10 to 95% by mass.

That is, for example, in a case where the metals include at least iron and copper, the ratio of the content of copper to the total of the content of iron and the content of copper may be 10 to 95% by mass. In this case, the ratio of the content of iron may be 5 to 90% by mass.

Further, for example, in a case where the metals include at least cobalt and copper, the ratio of the content of copper to the total of the content of cobalt and the content of copper may be 10 to 95% by mass. In this case, the ratio of the content of cobalt may be 5 to 90% by mass.

Further, for example, in a case where the metals include at least iron, cobalt, and copper, the ratio of the content of copper to the total of the content of iron, the content of cobalt, and the content of copper, may be 10 to 95% by mass. In this case, the ratio of the total of the content of iron and the content of cobalt may be 5 to 90% by mass.

In addition, the ratio of the content of copper to the total of the content of iron and/or the content of cobalt, and the content of copper, may be, for example, 10 to 90% by mass, 15 to 90% by mass, or 20 to 90% by mass.

The raw material may further contain another component. That is, the raw material may contain a carbon material, for example. For example, a conductive carbon material may be preferably used as the carbon material. The conductive carbon material is not particularly limited as long as the material gives conductivity to a carbon catalyst produced by the method of the present invention or improves conductivity of the carbon catalyst, and any one or more kinds of material may be used. That is, for example, a carbon material having conductivity and having no catalytic activity in itself may be used as the conductive carbon material.

Specifically, there may be used, for example, one or more kinds selected from the group consisting of carbon black, a carbon nanotube, a carbon nanohorn, a carbon fiber, a carbon fibril, and graphite powder.

In the raw material preparation step, a raw material including an organic substance containing a nitrogen atom and metals including iron and/or cobalt, and copper, is mixed. A method of mixing the raw material is not particularly limited, and for example, a mortar or a stirring device may be used. In addition, one or more type of mixing method, such as powder mixing for mixing the powdery organic substance and metals, and solvent mixing for mixing the raw material after addition of a solvent, may be used.

In the subsequent carbonization step, the raw material prepared as described above is carbonized. That is, the raw material is heated and maintained at a predetermined temperature suitable for carbonization of the raw material (carbonization temperature).

The carbonization temperature is not particularly limited as long as the raw material is carbonized. For example, the carbonization temperature may be 300° C. or more. More specifically, the carbonization temperature may be, for example, 300° C. or more and 1,500° C. or less, preferably 400° C. or more and 1,200° C. or less, more preferably 500° C. or more and 1,100° C. or less.

The temperature increase rate in heating of the raw material to a carbonization temperature is not particularly limited. For example, the temperature increase rate may be 0.5° C./min or more and 300° C./min or less. The time for maintaining the raw material at the carbonization temperature (carbonization time) is not particularly limited as long as the raw material is carbonized, and the time may be 5 minutes or more, for example. More specifically, the carbonization time may be, for example, 5 minutes or more and 240 minutes or less, preferably 20 minutes or more and 180 minutes or less. In addition, carbonization is preferably carried out in an inert gas such as nitrogen (for example, under an inert gas flow).

Thus, in the carbonization step, a carbonized material produced by carbonization of the raw material is obtained. The resultant carbonized material may be pulverized. A method of pulverizing the carbonized material is not particularly limited, and for example, a pulverization device such as a ball mill or a bead mill may be used. The average particle size of the pulverized carbonized material may be, for example, 150 μm or less, preferably 100 μm or less. In the method of the present invention, the carbonized material produced by carbonization may be obtained as the carbon catalyst without additional treatments.

In addition, in the method of the present invention, the carbonized material produced by carbonization may be further treated to obtain a treated carbonized material as a carbon catalyst. In this case, the treated carbonized material may be pulverized to obtain a pulverized product as a carbon catalyst.

That is, in the method of the present invention, for example, the carbonized material may be subjected to a metal-removing treatment. The metal-removing treatment is a treatment for removing metals in the carbonized material. The metal-removing treatment is not particularly limited as long as the metals in the carbonized material are removed or the amount of the metals is reduced. For example, a washing treatment with an acid or an electrolytic treatment may be carried out.

The acid to be used for the washing treatment with an acid is not particularly limited as long as an effect of the metal-removing treatment is obtained, and any one or more kinds of acid may be used. That is, for example, one or more kinds selected from the group consisting of hydrochloric acid (for example, concentrated hydrochloric acid), nitric acid (for example, concentrated nitric acid), and sulfuric acid (for example, concentrated sulfuric acid) may be used. In a case of using two or more acids, a mixed acid prepared by mixing concentrated hydrochloric acid and concentrated nitric acid at a predetermined volume ratio (for example, aqua regia) or a mixed acid prepared by mixing concentrated nitric acid and concentrated sulfuric acid at a predetermined volume ratio may be used. A method for the washing treatment with an acid is not particularly limited, and for example, a method involving immersing a carbonized material in a solution containing an acid and maintaining the material may be employed.

In addition, in the method of the present invention, for example, the carbonized material may be subjected to the metal-removing treatment and subsequently to a heat treatment. That is, in this case, first, the carbonized material is subjected to the above-mentioned metal-removing treatment, and the carbonized material that has been subjected to the metal-removing treatment is then heat-treated.

The heat treatment is carried out by maintaining the carbonized material at a predetermined temperature (heat treatment temperature) The heat treatment temperature may be, for example, 300° C. or more or 400° C. or more. More specifically, the heat treatment temperature may be, for example, 300° C. or more and 1,500° C. or less, preferably 400° C. or more and 1,400° C. or less, more preferably 500° C. or more and 1,300° C. or less.

The heat treatment temperature may be equal to or different from the above-mentioned carbonization temperature. That is, the heat treatment temperature may be lower than the carbonization temperature. In addition, the heat treatment temperature may be higher than the carbonization temperature.

Specifically, for example, in a case where the carbonization temperature is 500° C. or more and 1,100° C. or less, the heat treatment temperature may be 400° C. or more and 1,000° C. or less, and equal to or lower than the carbonization temperature.

The temperature increase rate in heating of the carbonized material to the heat treatment temperature and the time for maintaining the carbonized material at the heat treatment temperature may be the same as those in the above-mentioned case of carbonization. The heat treatment is preferably carried out in an inert gas such as nitrogen (for example, in an inert gas flow). The metal-removing treatment and the heat treatment may be repeated twice or more.

In a case where the metal-removing treatment or the metal-removing treatment and the heat treatment are carried out, a carbon catalyst having a further improved catalytic activity is produced. That is, in this case, for example, the catalytic activity of the carbon catalyst is enhanced efficiently by removing metal components from the carbonized material to exposure active sites.

In addition, in the method of the present invention, nitrogen atoms or boron atoms may be doped into the carbonized material at any step. That is, for example, nitrogen atoms or boron atoms may be doped into one or more of the carbonized material obtained by the carbonization step, the carbonized material after the metal-removing treatment, and the carbonized material after the metal-removing treatment and the heat treatment. As a method of doping nitrogen atoms or boron atoms, for example, a gas-phase doping method such as an ammoxidation method or a CVD method, a liquid-phase doping method, or a gas-phase-liquid-phase doping method may be employed. Specifically, for example, a nitrogen source such as ammonia, melamine, or acetonitrile, or a boron source such as boric acid or sodium borohydride is mixed with the carbonized material, and the resultant mixture may be maintained under an inert gas (such as nitrogen, argon, or helium) atmosphere at a temperature of 550° C. or more and 1,200° C. or less for a time of 5 minutes or more and 180 minutes or less, to thereby dope the nitrogen atoms into the surface of the carbonized material. In addition, the resultant carbonized material may be subjected to an activation treatment such as carbon dioxide activation, phosphoric acid activation, alkali activation, hydrogen activation, ammonia activation, nitric oxide activation, or electric activation and/or a liquid-phase oxidation such as nitric acid oxidation, mixed acid oxidation, or hydrogen peroxide oxidation.

Next, a carbon catalyst according to this embodiment (hereinafter, referred to as "catalyst of the present invention") will be described. The catalyst of the present invention is preferably produced by the above-mentioned method of the present invention. That is, the catalyst of the present invention is, for example, a carbon catalyst obtained by carbonizing a raw material including an organic substance containing a nitrogen atom and metals, in which the metals include iron and/or cobalt, and copper.

Further, the catalyst of the present invention is a carbon catalyst appropriately controlled in a balance between the degree of development of a carbon structure which contributes to the catalytic activity and the nitrogen atom content by carbonization of a raw material including iron and/or cobalt, and copper as the metals.

The catalyst of the present invention may include, as the metals, at least iron and copper, at least cobalt and copper, or at least iron, cobalt, and copper. In particular, the catalyst of the present invention preferably includes at least iron and copper as the metals from the standpoints of appropriately controlling a balance between the degree of development of a carbon structure which contributes to the catalytic activity and the nitrogen atom content and effectively improving the catalytic activity.

In addition, the catalyst of the present invention may be, for example, a carbon catalyst obtained by subjecting the carbonized material obtained by carbonizing the raw material to the above-mentioned metal-removing treatment. Further, the catalyst of the present invention may be, for example, a carbon catalyst obtained by subjecting the carbonized material obtained by carbonizing the raw material to the above-mentioned metal-removing treatment and heat treatment.

It should be noted that in a case where the catalyst of the present invention is obtained through the metal-removing treatment, the catalyst of the present invention may be substantially free of metals or may contain remaining iron and/or cobalt, and copper. That is, the catalyst of the present invention may contain iron, cobalt, and copper at a ratio which reflects the ratio of the metals in the raw material. It should be noted that the metals remaining in the catalyst of the present invention are determined by an elemental analysis or the like.

Specifically, the ratio of the total of the content of iron and/or the content of cobalt, and the content of copper to the total amount of metals (in particular, transition metals) in the catalyst of the present invention may be, for example, 60% by mass or more (that is, 60% by mass to 100% by mass), preferably 70% by mass or more, more preferably 90% by mass or more, particularly preferably 95% by mass or more.

In addition, the ratio of the content of copper to the total of the content of iron and/or the content of cobalt, and the content of copper in the catalyst of the present invention may be, for example, 10 to 95% by mass, 10 to 90% by mass, 15 to 90% by mass, or 20 to 90% by mass.

In addition, the catalyst of the present invention may be characterized by having a structure appropriately controlled in a balance between the degree of development of a carbon structure which contributes to the catalytic activity and the nitrogen atom content, and having an improved catalytic activity.

That is, the catalyst of the present invention is, for example, a carbon catalyst having a crystallinity of 41.0% or less, which is determined by X-ray diffractometry, a nitrogen atom-to-carbon atom ratio (hereinafter, referred to as "N/C ratio") of 0.7 or more, which is determined by X-ray photoelectronic spectrometry, and an oxygen reduction-starting potential of 0.774 V (vs. NHE) or more. It should be noted that in this case also, the catalyst of the present invention may be substantially free of metals or may contain iron and/or cobalt, and copper at the ratio mentioned above.

The crystallinity reflects a degree of development of the carbon structure. That is, as the crystallinity of the carbon catalyst becomes larger, the carbon structure such as a shell-like structure becomes more developed in the carbon catalyst.

The crystallinity is determined by X-ray diffractometry. That is, in an X-ray diffraction pattern, in a case where a carbon catalyst has a developed carbon structure such as a shell-like structure (hereinafter, collectively referred to as "shell-like structure"), a diffraction peak of the (002) plane of carbon appears at a diffraction angle (2θ) of about 26°. The peak is a mixture of two kinds of peak, that is, a peak attributed to the (002) plane of the shell-like structure (hereinafter, referred to as "shell-like structure peak") and a peak attributed to an amorphous structure (hereinafter, referred to as "amorphous structure peak"). The crystallinity is determined as a ratio (%) of a peak area of the shell-like structure to a total of the peak area of the shell-like structure and a peak area of the amorphous structure in the X-ray diffraction pattern.

As a result of suppressing excessive development of the shell-like structure, the catalyst of the present invention has a crystallinity of 41.0% or less. The crystallinity may be, for example, 5.0 to 41.0%, 5.0 to 35.0%, or 5.0 to 30.0%.

The N/C ratio is determined by X-ray photo emission spectroscopy (XPS method). That is, the N/C ratio is determined as a ratio of nitrogen atoms to carbon atoms (N/C) on the surface of the catalyst of the present invention based on spectra obtained by the XPS method for the catalyst of the present invention.

As a result of maintaining the nitrogen atom content derived from the raw material in moderation, the catalyst of the present invention has an N/C ratio of 0.7 or more. The N/C ratio may be, for example, 0.7 to 10.0, or 1.0 to 10.0.

In addition, the catalyst of the present invention has, for example, an oxygen reduction activity as one of the catalytic activities. Further, the oxygen reduction activity of the catalyst of the present invention is evaluated based on an oxygen reduction-starting potential. For example, the oxygen reduction-starting potential is determined as a voltage ($E_{O2}$) measured at a reduction current of −10 µA/cm² based on data showing a relationship between a voltage and a current density (oxygen reduction voltammogram) obtained by sweeping and applying a potential using a rotating ring disk electrode device having a working electrode coated with the catalyst of the present invention.

As a result of suppressing excessive development of the shell-like structure and appropriately maintaining the nitrogen atom content, the catalyst of the present invention has an oxygen reduction-starting potential of 0.774 V (vs. NHE) or more (more specifically, for example, 0.774 V (vs. NHE) or more, 1.2 V (vs. NHE) or less). The oxygen reduction-starting potential may be, for example, 0.780 V (vs. NHE) or more, 0.785 V (vs. NHE) or more, 0.790 V (vs. NHE) or more, 0.795 V (vs. NHE) or more, 0.800 V (vs. NHE) or more, or 0.810 V (vs. NHE) or more.

In addition, the catalyst of the present invention has a specific surface area of, for example, 10 m²/g or more, preferably 100 m²/g or more, which is determined by a nitrogen adsorption BET method. More specifically, the catalyst of the present invention has a specific surface area of, for example, 200 m²/g or more and 3,000 m²/g or less, preferably 300 m²/g or more and 3,000 m²/g or less.

The catalyst of the present invention is a carbon catalyst having an excellent activity as mentioned above, and hence is used as an alternative to an expensive platinum catalyst. That is, the catalyst of the present invention includes no noble metal catalyst such as a platinum catalyst supported therein, has a high activity by itself, and includes an inexpensive and useful carbonized material.

Therefore, the catalyst of the present invention is used as, for example, a synthetic catalyst, an environmental catalyst, an electrode catalyst for a battery, an electrode catalyst for a fuel cell, an electrode catalyst for an air cell, or a hydrogen peroxide decomposition catalyst. According to the catalyst of the present invention, various chemical reactions including an oxygen reduction reaction are effectively promoted without using a noble metal catalyst such as a platinum catalyst.

An electrode according to this embodiment (hereinafter, referred to as "electrode of the present invention") is an electrode including the catalyst of the present invention. That is, the electrode of the present invention is, for example, an electrode including the catalyst of the present invention supported therein. Specifically, the electrode of the present invention is, for example, an electrode having a predetermined electrode base material and the catalyst of the present invention supported by the electrode base material.

The electrode of the present invention may be, for example, an electrode for a fuel cell, preferably an electrode for a polymer electrolyte fuel cell (PEFC). In addition, the electrode of the present invention may be, for example, an electrode for an air cell. In a case where the electrode of the present invention is the electrode for a fuel cell or electrode for an air cell, the electrode of the present invention is preferably a cathode electrode.

That is, the above-mentioned catalyst of the present invention may be, for example, an electrode catalyst for a fuel cell, preferably an electrode catalyst for a PEFC. In addition, the catalyst of the present invention may be, for example, an electrode catalyst for an air cell. Further, in a case where the catalyst of the present invention is the electrode catalyst for a fuel cell or the electrode catalyst for an air cell, the catalyst of the present invention is preferably a cathode electrode catalyst.

A battery according to this embodiment (hereinafter, referred to as "the battery of the present invention") is a battery equipped with the electrode of the present invention. That is, the battery of the present invention is a battery equipped with the electrode of the present invention as one or both of a cathode electrode and an anode electrode.

The battery of the present invention may be, for example, a fuel cell, preferably a PEFC. That is, the battery of the present invention may be, for example, a PEFC equipped with a membrane/electrode assembly including the electrode of the present invention. In addition, the battery of the present invention may be, for example, an air cell.

That is, the battery of the present invention may be, for example, a fuel cell or an air cell equipped with the electrode of the present invention as one or both of a cathode electrode and an anode electrode. In this case, the battery of the present invention is preferably equipped with the electrode of the present invention at least as the cathode electrode.

Specifically, the battery of the present invention may be, for example, a PEFC equipped with a membrane/electrode assembly obtained by integrating a polymer electrolyte membrane and a cathode electrode (positive electrode, air electrode) and an anode electrode (negative electrode, fuel electrode) respectively formed on one side and the other side of the polymer electrolyte membrane, in which one or both of the cathode electrode and the anode electrode are equipped with the electrode of the present invention. In this case, the battery of the present invention is preferably equipped with the electrode of the present invention at least on the cathode electrode.

As mentioned above, according to the present invention, a carbon catalyst having an improved catalytic activity, a production method thereof, and an electrode and a battery which use the carbon catalyst are realized.

That is, as mentioned above, the inventors of the present invention have found that a balance between the degree of development of a carbon structure which contributes to the catalytic activity and the nitrogen atom content are appropriately controlled to effectively improve the catalytic activity by using iron and/or cobalt which effectively develops the shell-like structure and copper, which has almost no effect on the development of the shell-like structure, in combination.

Such control and high catalytic activity realized as a result of the control cannot be achieved, for example, only by adjusting the amount of iron and/or cobalt used, by externally doping nitrogen atoms by nitrogen doping or the like, or by using copper alone.

That is, such effects are obtained specifically by using iron and/or cobalt, and copper in combination. In a case where copper is used in combination with iron and/or cobalt, the high catalytic activity is achieved even if the carbon catalyst has a small amount of the shell-like structure or includes substantially no shell-like structure, for example.

Hereinafter, specific examples according to this embodiment will be described.

EXAMPLES (Production of Carbon Catalyst Fe100/Cu0)

First, a raw material to be carbonized was prepared. That is, 10 g of a phenol resin (PSK-2320, manufactured by Gunei Chemical Industry Co., Ltd.) was added to 800 mL of acetone, and the mixture was sonicated for 10 minutes in an ultrasonic washing device to dissolve the phenol resin in acetone.

Subsequently, 5.09 g of phthalocyanine iron was added to the resultant resin solution so that the ratio of the total amount of metals in solid contents of a raw material to be finally obtained was 5 wt % and the ratio of the content of iron to the total amount of the metals was 100 wt %. Thereafter, the resultant mixture was sonicated for 30 minutes to disperse phthalocyanine iron in the resin solution.

Further, acetone was removed by a rotary evaporator until the resultant dispersion became an oily mixture due to its reduced fluidity. After that, the resultant composition was dried under reduced pressure at 70° C. overnight. The composition thus dried was obtained as a raw material for carbonization.

Next, the raw material was carbonized. That is, 1.0 g of the raw material was heated in an infrared image furnace in a nitrogen atmosphere at a temperature increase rate of 10° C./min. Thereafter, the raw material was maintained at 800° C. for 1 hour to carbonize the material, thereby obtaining a carbonized material.

Further, the carbonized material was pulverized. That is, a treatment for pulverizing the carbonized material at a rotation rate of 750 rpm for 5 minutes was repeated 18 times using a silicon nitride ball having a diameter of 10 mm set in a planet ball mill (P-7, manufactured by Fritsch Japan Co., Ltd.). After that, the pulverized carbonized material was sieved using a 106 μm-mesh sieve, and the carbonized material that passed through the sieve was obtained as a pulverized particulate carbonized material.

Further, the carbonized material was subjected to a metal-removing treatment by washing with an acid. That is, the carbonized material obtained as described above was added to 100 mL of concentrated hydrochloric acid, and the mixture was stirred at room temperature for 2 hours by a stirrer. Subsequently, the solution containing the carbonized material was filtered under vacuum using a membrane filter having a pore size of 0.1 μm, and the residue was washed with distilled water until the filtrate became neutral. The procedure was repeated three times.

After that, the collected carbonized material was dried under reduced pressure at 80° C. overnight. Thereafter, the dried carbonized material was pulverized using a mortar. The particulate carbonized material thus pulverized was obtained as a carbon catalyst Fe100/Cu0.

(Production of Carbon Catalyst Fe75/Cu25)

A carbon catalyst was produced in the same manner as in the case of the above-mentioned carbon catalyst Fe100/Cu0 except that the ratio of the content of iron and the ratio of the content of copper to the total amount of metals were set to 75 wt % and 25 wt %, respectively.

That is, a phenol resin was dissolved in acetone to prepare a resin solution, and 3.82 g of phthalocyanine iron and 1.13 g of phthalocyanine copper were added to the resin solution so that the total amount of metals in solid contents of a raw material to be finally obtained was 5 wt % and the ratio of the content of iron and the ratio of the content of copper to the total amount of the metals were 75 wt % and 25 wt %, respectively.

After that, preparation of a raw material, carbonization of the raw material, pulverization of the carbonized material, and the metal-removing treatment by washing with an acid were carried out in the same manner as in the case of the above-mentioned carbon catalyst Fe100/Cu0. Thus, a carbon catalyst Fe75/Cu25 was obtained.

(Production of Carbon Catalyst Fe50/Cu50)

A carbon catalyst Fe50/Cu50 was produced in the same manner as in the case of the above-mentioned carbon catalyst Fe75/Cu25 except that the ratio of the content of iron and the ratio of the content of copper to the total amount of metals were set to 50 wt % and 50 wt %, respectively (2.54 g of phthalocyanine iron and 2.27 g of phthalocyanine copper were used).

(Production of Carbon Catalyst Fe35/Cu65)

A carbon catalyst Fe35/Cu65 was produced in the same manner as in the case of the above-mentioned carbon catalyst Fe75/Cu25 except that the ratio of the content of iron and the ratio of the content of copper to the total amount of metals were set to 35 wt % and 65 wt %, respectively (1.78 g of phthalocyanine iron and 2.95 g of phthalocyanine copper were used).

(Production of Carbon Catalyst Fe25/Cu75)

A carbon catalyst Fe25/Cu75 was produced in the same manner as in the case of the above-mentioned carbon catalyst Fe75/Cu25 except that the ratio of the content of iron and the ratio of the content of copper to the total amount of metals were set to 25 wt % and 75 wt %, respectively (1.27 g of phthalocyanine iron and 3.40 g of phthalocyanine copper were used).

(Production of Carbon Catalyst Fe15/Cu85)

A carbon catalyst Fe15/Cu85 was produced in the same manner as in the case of the above-mentioned carbon catalyst Fe75/Cu25 except that the ratio of the content of iron and the ratio of the content of copper to the total amount of metals were set to 15 wt % and 85 wt %, respectively (0.76 g of phthalocyanine iron and 3.85 g of phthalocyanine copper were used).

(Production of Carbon Catalyst Fe0/Cu100)

A carbon catalyst Fe0/Cu100 was produced in the same manner as in the case of the above-mentioned carbon catalyst Fe100/Cu0 except that the ratio of the content of copper to the total amount of metals was set to 100 wt % (4.53 g of phthalocyanine copper was used).

(Production of Carbon Catalyst Fe25/Cu75(C900))

A carbon catalyst Fe25/Cu75(C900) was produced in the same manner as in the case of the above-mentioned carbon catalyst Fe25/Cu75 except that the carbonization temperature was set to 900° C.

(Production of Carbon Catalyst Fe25/Cu75(C1000))

A carbon catalyst Fe25/Cu75(C900) was produced in the same manner as in the case of the above-mentioned carbon catalyst Fe25/Cu75 except that the carbonization temperature was set to 1,000° C.

(Production of Carbon Catalyst Fe25/Cu75(10))

A carbon catalyst Fe25/Cu75(10) was produced in the same manner as in the case of the above-mentioned carbon catalyst Fe25/Cu75 except that the total amount of metals was set to 10 wt % (2.54 g of phthalocyanine iron and 6.80 g of phthalocyanine copper were used).

(Production of Carbon Catalyst Fe25/Cu75 (15))

A carbon catalyst Fe25/Cu75 (15) was produced in the same manner as in the case of the above-mentioned carbon catalyst Fe25/Cu75 except that the total amount of metals was set to 15 wt % (3.82 g of phthalocyanine iron and 10.20 g of phthalocyanine copper were used).

(Production of Carbon Catalyst Fe23/Cu69/Co8)

A carbon catalyst Fe23/Cu69/Co8 was produced in the same manner as in the case of the above-mentioned carbon catalyst Fe25/Cu75 except that the ratio of the content of iron, the ratio of the content of copper, and the ratio of the content of cobalt to the total amount of metals were set to 23.08 wt %, 69.23 wt %, and 7.69 wt %, respectively (1.17 g of phthalocyanine iron, 3.14 g of phthalocyanine copper, and 0.37 g of phthalocyanine cobalt was used).

(Production of Carbon Catalyst Fe75/Ni25)

A carbon catalyst Fe75/Ni25 was produced in the same manner as in the case of the above-mentioned carbon catalyst Fe75/Cu25 except that the ratio of the content of iron and the ratio of the content of nickel to the total amount of metals were set to 75 wt % and 25 wt %, respectively (3.82 g of phthalocyanine iron and 1.21 g of phthalocyanine nickel were used).

(Production of Carbon Catalyst Fe25/Ni75)

A carbon catalyst Fe25/Ni75 was produced in the same manner as in the case of the above-mentioned carbon catalyst Fe75/Cu25 except that the ratio of the content of iron and the ratio of the content of nickel to the total amount of metals were set to 25 wt % and 75 wt %, respectively (1.27 g of phthalocyanine iron and 3.65 g of phthalocyanine nickel was used).

(Production of Carbon Catalyst Fe0/Ni100)

A carbon catalyst Fe0/Ni100 was produced in the same manner as in the case of the above-mentioned carbon catalyst Fe0/Cu100 except that the ratio of the content of nickel to the total amount of metals was set to 100 wt % (4.87 g of phthalocyanine nickel was used).

(Production of Carbon Catalyst Fe75/Mn25)

A carbon catalyst Fe75/Mn25 was produced in the same manner as in the case of the above-mentioned carbon catalyst Fe75/Cu25 except that the ratio of the content of iron and the ratio of the content of manganese to the total amount of metals were set to 75 wt % and 25 wt %, respectively (3.82 g of phthalocyanine iron and 1.29 g of phthalocyanine manganese were used).

(Production of Carbon Catalyst Fe25/Mn75)

A carbon catalyst Fe25/Mn75 was produced in the same manner as in the case of the above-mentioned carbon catalyst Fe75/Cu25 except that the ratio of the content of iron and the ratio of the content of manganese to the total amount of metals were set to 25 wt % and 75 wt %, respectively (1.27 g of phthalocyanine iron and 3.87 g of phthalocyanine manganese were used).

(Production of Carbon Catalyst Fe0/Mn100)

A carbon catalyst Fe0/Mn100 was produced in the same manner as in the case of the above-mentioned carbon catalyst Fe0/Cu100 except that the ratio of the content of manganese to the total amount of metals was set to 100 wt % (5.16 g of phthalocyanine manganese was used).

(Production of Carbon Catalyst Fe100/Cu0(H))

The carbon catalyst Fe100/Cu0 obtained as described above was heat-treated. That is, the carbon catalyst Fe100/Cu0 was heated in the infrared image furnace in a nitrogen atmosphere at a temperature increase rate of 50° C./min. Thereafter, the carbon catalyst Fe100/Cu0 was maintained at 700° C. for 1 hour to be heat-treated. Thus, the heat-treated carbon catalyst Fe100/Cu0 was obtained as a carbon catalyst Fe100/Cu0(H).

(Production of Carbon Catalyst Fe75/Cu25(H))

A carbon catalyst Fe75/Cu25(H) was produced in the same manner as in the case of the above-mentioned carbon catalyst Fe100/Cu0(H) except that the carbon catalyst Fe75/Cu25 obtained as described above was heat-treated.

(Production of Carbon Catalyst Fe50/Cu50(H))

A carbon catalyst Fe50/Cu50(H) was produced in the same manner as in the case of the above-mentioned carbon catalyst Fe100/Cu0(H) except that the carbon catalyst Fe50/Cu50 obtained as described above was heat-treated.

(Production of Carbon Catalyst Fe35/Cu65(H))

A carbon catalyst Fe35/Cu65(H) was produced in the same manner as in the case of the above-mentioned carbon catalyst Fe100/Cu0(H) except that the carbon catalyst Fe35/Cu65 obtained as described above was heat-treated.

(Production of Carbon Catalyst Fe25/Cu75(H))

A carbon catalyst Fe25/Cu75(H) was produced in the same manner as in the case of the above-mentioned carbon catalyst Fe100/Cu0(H) except that the carbon catalyst Fe25/Cu75 obtained as described above was heat-treated.

(Production of Carbon Catalyst Fe15/Cu85(H))

A carbon catalyst Fe15/Cu85(H) was produced in the same manner as in the case of the above-mentioned carbon catalyst Fe100/Cu0(H) except that the carbon catalyst Fe15/Cu85 obtained as described above was heat-treated.

(Production of Carbon Catalyst Fe0/Cu100(H))

A carbon catalyst Fe0/Cu100(H) was produced in the same manner as in the case of the above-mentioned carbon catalyst Fe100/Cu0(H) except that the carbon catalyst Fe0/Cu100 obtained as described above was heat-treated.

(Production of Carbon Catalyst Fe25/Cu75(C900)(H))

A carbon catalyst Fe25/Cu75 (C900)(H) was produced in the same manner as in the case of the above-mentioned carbon catalyst Fe100/Cu0(H) except that the carbon catalyst Fe25/Cu75(C900) obtained as described above was heat-treated.

(Production of Carbon Catalyst Fe25/Cu75(C1000)(H))

A carbon catalyst Fe25/Cu75(C1000)(H) was produced in the same manner as in the case of the above-mentioned carbon catalyst Fe100/Cu0(H) except that the carbon catalyst Fe25/Cu75(C1000) obtained as described above was heat-treated.

(Production of Carbon Catalyst Fe25/Cu75(10)(H))

A carbon catalyst Fe25/Cu75(10)(H) was produced in the same manner as in the case of the above-mentioned carbon catalyst Fe100/Cu0(H) except that the carbon catalyst Fe25/Cu75(10) obtained as described above was heat-treated.

(Production of Carbon Catalyst Fe25/Cu75(15)(H))

A carbon catalyst Fe25/Cu75(15)(H) was produced in the same manner as in the case of the above-mentioned carbon catalyst Fe100/Cu0(H) except that the carbon catalyst Fe25/Cu75 (15) obtained as described above was heat-treated.

(Production of Carbon Catalyst Fe100/Cu0(1.25)(H))

First, a carbon catalyst Fe100/Cu0(1.25) was produced in the same manner as in the case of the above-mentioned carbon catalyst Fe100/Cu0 except that the total amount of metals was set to 1.25 wt % and the ratio of the content of iron to the total amount of metals was set to 100 wt % (1.27 g of phthalocyanine iron were used).

Next, a carbon catalyst Fe100/Cu0(1.25)(H) was produced in the same manner as in the case of the above-mentioned carbon catalyst Fe100/Cu0(H) except that the carbon catalyst Fe100/Cu0(1.25) obtained as described above was heat-treated.

(Production of Carbon Catalyst Fe23/Cu69/Co8(H))

A carbon catalyst Fe23/Cu69/Co8(H) was produced in the same manner as in the case of the above-mentioned carbon catalyst Fe100/Cu0(H) except that the carbon catalyst Fe23/Cu69/Co8 obtained as described above was heat-treated.

(Production of Carbon Catalyst Fe100/Cu0(H)(N))

The carbon catalyst Fe100/Cu0(H) obtained as described above was doped with nitrogen. That is, the carbon catalyst Fe100/Cu0(H) was maintained at 600° C. for 2 hours in a mixed gas including ammonia gas and air (ammonia gas:air=7:3 (by volume)) to dope nitrogen atoms into the carbon catalyst Fe100/Cu0(H). Thus, the nitrogen-doped carbon catalyst Fe100/Cu0(H) was obtained as a carbon catalyst Fe100/Cu0(H)(N).

(Production of Carbon Catalyst Fe75/Cu25(H)(N))

A carbon catalyst Fe75/Cu25(H)(N) was produced in the same manner as in the case of the above-mentioned carbon catalyst Fe100/Cu0(H)(N) except that the carbon catalyst Fe75/Cu25(H) obtained as described above was doped with nitrogen.

(Production of Carbon Catalyst Co100/Cu0(H))

First, a carbon catalyst Co100/Cu0 was produced in the same manner as in the case of the above-mentioned carbon catalyst Fe100/Cu0 except that the ratio of the content of cobalt to the total amount of metals was set to 100 wt % (4.85 g of phthalocyanine cobalt was used).

Next, a carbon catalyst Co100/Cu0(H) was produced in the same manner as in the case of the above-mentioned carbon catalyst Fe100/Cu0(H) except that the carbon catalyst Co100/Cu0 obtained as described above was heat-treated.

(Production of Carbon Catalyst Co75/Cu25(H))

A carbon catalyst Co75/Cu25(H) was produced in the same manner as in the case of the above-mentioned carbon catalyst Fe100/Cu0(H) except that the ratio of the content of cobalt and the ratio of the content of copper to the total amount of metals were set to 75 wt % and 25 wt %, respectively (3.64 g of phthalocyanine cobalt and 1.13 g of phthalocyanine copper were used).

(Production of Carbon Catalyst Co25/Cu75(H))

A carbon catalyst Co25/Cu75(H) was produced in the same manner as in the case of the above-mentioned carbon catalyst Fe100/Cu0(H) except that the ratio of the content of cobalt and the ratio of the content of copper to the total amount of metals were set to 25 wt % and 75 wt %, respectively (1.21 g of phthalocyanine cobalt and 3.40 g of phthalocyanine copper were used).

(Production of Carbon Catalyst Fe25/Ni75(H))

A carbon catalyst Fe25/Ni75(H) was produced in the same manner as in the case of the above-mentioned carbon catalyst Fe100/Cu0(H) except that the carbon catalyst Fe25/Ni75 obtained as described above was heat-treated.

(Production of Carbon Catalyst Fe0/Ni100(H))

A carbon catalyst Fe0/Ni100(H) was produced in the same manner as in the case of the above-mentioned carbon catalyst Fe100/Cu0(H) except that the carbon catalyst Fe0/Ni100 obtained as described above was heat-treated.

(Production of Carbon Catalyst Fe25/Mn75(H))

A carbon catalyst Fe25/Mn75(H) was produced in the same manner as in the case of the above-mentioned carbon catalyst Fe100/Cu0(H) except that the carbon catalyst Fe25/Mn75 obtained as described above was heat-treated.

(Production of Carbon Catalyst Fe0/Mn100(H))

A carbon catalyst Fe0/Mn100(H) was produced in the same manner as in the case of the above-mentioned carbon catalyst Fe100/Cu0(H) except that the carbon catalyst Fe0/Mn100 obtained as described above was heat-treated.

(Observation Under Transmission Electron Microscope)

The carbon catalysts obtained as described above were observed under a transmission electron microscope (TEM).

(Evaluation of Crystallinity)

A powdery carbon catalyst sample was placed on a concave portion of a glass sample plate (2 cm×2 cm×0.2 mm thick) and pressed with a glass slide, and the concave portion was uniformly filled with the sample so that the surface corresponded to a reference level. Subsequently, the glass sample plate was fixed on a wide-angle X-ray diffraction stage so that the sample filling the concave portion was not deformed.

Thereafter, X-ray diffraction measurement (XRD) was carried out using an X-ray diffractometer (Rigaku RINT2000/PC, manufactured by Rigaku Corporation). The voltage and current applied to the X-ray vacuum tube were 50 kV and 300 mA, respectively. The measurement was carried out at a sampling interval of 0.1°, a scanning speed of 1°/min, and a measurement angle range (2θ) of 5 to 90°. CuKα was used as an incident X-ray.

Diffraction line intensity correction and background correction of diffraction data of the X-ray diffraction measurement from 5° to 40° were carried out. The diffraction line intensity correction was carried out at a carbon linear absorption coefficient μ of 4.219, a sample thickness t of 0.2 mm, a divergence slit width β of 2/3°, and a goniometer radius R of 285 mm. The background correction was carried out at base points of about 15° and about 35° by a spline interpolation method.

In this case, as mentioned above, in the X-ray diffraction pattern, in a case where the carbon catalyst has a shell-like structure, a diffraction peak of the (002) plane of carbon appears at a diffraction angle (2θ) of about 26°. The peak is a mixture of two kinds of peak, that is, a shell-like structure peak attributed to the (002) plane of the shell-like structure and an amorphous structure peak attributed to the amorphous structure.

Then, the peak at about 26° was separated into the shell-like structure peak and the amorphous structure peak through the peak separation of the X-ray diffraction data. The peaks were separated by approximating the overlapped peaks by superposition of Gaussian basic waveforms. Fitting was carried out by optimizing a diffraction pattern in which a Lorentz polarization factor and a carbon atomic scattering factor were corrected based on components serving as parameters including a peak intensity, a peak half width, and a peak position of a Gaussian function.

Thereafter, the ratio (%) of a peak area of the shell-like structure to a peak area before separation (that is, the total of the peak area of the shell-like structure and the peak area of the amorphous structure) was calculated and evaluated as a crystallinity, which was an index representing the degree of development (crystallization) of the shell-like structure. As the amount of the developed shell-like structure in the carbon catalyst becomes larger, the crystallinity becomes larger.

It should be noted that the crystallinity corresponds to the ratio of a sharp component area to the total of the sharp component area and a substantially flat component area in an X-ray diffraction diagram corresponding to the (002) plane reflection of the carbon particle in the shell-like structure as disclosed in JP 2007-207662 A.

(Evaluation of N/C Ratio)

Photoelectron spectra from core levels of carbon atoms and nitrogen atoms on the surface of the carbon catalysts were measured by the XPS method using an X-ray photoemission spectroscopy device (AXIS NOVA, manufactured by KRATOS). An AlKα ray (10 mA, 15 kV, Pass energy: 40 eV) was used as an X-ray source.

The resultant spectra were corrected for the binding energy based on a C1s spectrum peak of 284.5 eV. From peak areas and detection sensitivity coefficients of the spectra, element concentrations (%) of the nitrogen atoms and carbon atoms on the surface of the carbon catalysts were determined. Thereafter, the atom ratio of the nitrogen atoms to the carbon atoms was evaluated as an "N/C ratio."

(Evaluation of Oxygen Reduction Catalytic Activity)

First, a catalyst slurry was prepared. That is, 5 mg of a powdery carbon catalyst were weighed, and 50 μL of a binder solution (Nafion (trademark), manufactured by Du Pont), 150 μL of water, 150 μL of ethanol, two spatulas of glass beads (diameter: 1 mm) (about 15 beads) were mixed with the catalyst, followed by sonication for 10 minutes, to thereby prepare a catalyst slurry including the catalyst dispersed homogeneously.

Subsequently, 4 μL of the catalyst slurry were sucked by a pipette, applied onto a disk electrode (diameter 6 mm) of a rotating ring disk electrode device (RRDE-1, SC-5, manufactured by Nikko Keisoku), and dried, to thereby prepare a working electrode. A platinum electrode was used as a ring electrode. A silver/silver chloride (Ag/AgCl) electrode was used as a counter electrode. A 0.5 M sulfuric acid aqueous solution containing oxygen dissolved therein at ordinary temperature was used as an electrolyte solution.

Thereafter, linear sweep voltammetry was carried out using an electrochemical analyzer (CHI700D, manufactured by ALS Co. Ltd.). In the linear sweep voltammetry, a potential was calculated by converting a value measured using the silver/silver chloride electrode into a normal hydrogen electrode (NHE) standard value.

First, the electrolyte solution was saturated with oxygen by bubbling the solution with oxygen at 25° C. for 20 minutes, and then measurement was started. Subsequently, the initial potential was maintained for 600 seconds, and then the electrode was rotated at a rotation rate of 1,500 rpm. The potential was swept from 0.8 V (vs. Ag/AgCl) to −0.2 V (vs. Ag/AgCl) at 25° C. at a sweeping rate of 1 mV/sec to measure a value of current flowing through the working electrode. That is, the potential was swept from 1.0 V (vs. NHE) to 0 V (vs. NHE) in terms of a normal hydrogen electrode (NHE) standard value.

The measured current was recorded as a potential function. Thereafter, the voltage at which a reduction current of −10 μA/cm$^2$ flowed was recorded as an oxygen reduction-starting potential (V vs. NHE) from the resultant polarization curve. In addition, a current density (mA/cm$^2$) when a voltage of 0.7 V (vs. NHE) was applied was also recorded.

FIGS. 1 and 2 show production conditions and evaluated characteristics of the above-mentioned carbon catalysts. That is, FIGS. 1 and 2 show types of the carbon catalysts ("CARBON CATALYST"), ratios (wt %) of the contents of metals to the total amount of the metals (the column of "RATIO OF METAL (wt %)"), contents (wt %) of the metals relative to a raw material ("Fe", "Co", "Cu", and "ANOTHER METAL" in the column of "CONTENT OF METAL (wt %)"), the total amount (wt %) of the metals relative to the raw material ("TOTAL" in the column "CONTENT OF METAL (wt %)"), oxygen reduction-starting potentials (V vs. NHE), current densities (mA/cm$^2$), crystallinity (%), and N/C ratios (−). It should be noted that the symbol "−" in the column "CRYSTALLINITY (%)" and the column "N/C RATIO (−)" in FIG. 1 represents that measurement was not carried out.

FIGS. 3 to 5 show examples of the results of observation of the carbon structures of the carbon catalysts under a transmission electron microscope. That is, FIGS. 3(A) to 3(D) show transmission electron micrographs of the carbon catalyst Fe100/Cu0(H) (FIGS. 3(A) to 3(C): 40 k, FIG. 3(D): 600 k), FIGS. 4(A) to 4(D) show transmission electron micrographs of the carbon catalyst Fe0/Cu100(H) (FIGS. 4(A) to 4(C): 40 k, FIG. 4(D): 150 k), and FIGS. 5(A) to 5(D) show transmission electron micrographs of the carbon catalyst Fe25/Cu75(H) (FIGS. 5(A) to 5(C): 40 k, FIG. 5(D): 150 k).

Particular effects obtained by the combination of iron and/or cobalt, and copper (in particular, the combination of iron and copper) in this example will be understood from the results shown in FIGS. 1 to 5 (in particular, FIGS. 1 and 2), and some of typical effects thereof are described below.

As shown in FIGS. 3(A) to 3(D), the carbon structure of the carbon catalyst Fe100/Cu0(H) obtained by using iron alone as a metal was found to have a developed shell-like structure. The high crystallinity shown in FIG. 2 (44.08%) supports such a carbon structure. On the other hand, the catalyst was found to have a relatively small N/C ratio (0.84). In addition, the catalyst was found to have a relatively large but insufficient oxygen reduction-starting potential (0.764 (V vs. NHE)). Further, the catalyst was found to have a small current density (−0.045 mA/cm$^2$).

As shown in FIGS. 4(A) to 4(D), the carbon structure of the carbon catalyst Fe0/Cu100(H) obtained by using copper alone as a metal was found to have no shell-like structure. The crystallinity shown in FIG. 2 (0.00%) supports such a carbon structure. On the other hand, the catalyst was found to have a significantly large N/C ratio (4.90). In addition, the catalyst was found to have a small oxygen reduction-starting potential (0.692 (V vs. NHE)) and a small current density (−0.003 mA/cm$^2$).

Meanwhile, as shown in FIGS. 5(A) to 5(D), in the carbon structure of the carbon catalyst Fe25/Cu75(H) obtained by using iron and copper as metals, a smaller shell-like structure was formed at a ratio smaller than that of the above-mentioned carbon catalyst Fe100/Cu0(H). The relatively small crystallinity shown in FIG. 2 (9.82%) supports such a carbon structure. On the other hand, the catalyst was found to have a relatively large N/C ratio (4.16). In addition, the catalyst was found to have a significantly large oxygen reduction-starting potential (0.834 (V vs. NHE)) and a large current density (−0.281 mA/cm$^2$).

As mentioned above, in the carbon catalyst Fe25/Cu75(H) obtained by using iron and copper, the large oxygen reduction-starting potential and current density were achieved by suppressing excessive development of the shell-like structure and effectively maintaining the nitrogen atom content derived from the raw material.

In addition, in the carbon catalyst Fe25/Cu75(H), suppression of an excessive increase in the size of the shell-like structure and suppression of disappearance of surface defects in the carbon structure were considered to contribute to the high oxygen reduction catalytic activity.

It should be noted that the suppression of development of the shell-like structure, maintaining of the nitrogen atom content, and high oxygen reduction catalytic activity in the carbon catalyst Fe25/Cu75(H) were not effects obtained by merely reducing the amount of iron used but specific effects obtained only by using copper in addition to iron.

That is, as shown in FIG. 2, a comparison of the carbon catalyst Fe25/Cu75(H) obtained by using iron and copper and the carbon catalyst Fe100/Cu0(1.25)(H) obtained by using iron alone in an amount equal to the carbon catalyst Fe25/Cu75(H) (1.25 wt %) shows that the latter has a large crystallinity (36.84%), a small N/C ratio (1.24), a small oxygen reduction-starting potential (0.773 (V vs. NHE)), and a small current density (−0.097 mA/cm$^2$) compared to the former.

In addition, even in the case of using a relatively large amount of iron, an increase in the amount of copper used caused suppression of development of the shell-like structure, maintaining of the nitrogen atom content, and improvement of the oxygen reduction catalytic activity.

That is, as shown in FIG. 2, a comparison of the carbon catalyst Fe75/Cu25(H) obtained by using a relatively large amount (3.75 wt %) of iron and a small amount of copper (1.25 wt %) and the carbon catalyst Fe25/Cu75(15)(H) obtained by using an equal amount (3.75 wt %) of iron and a larger amount of copper (11.25 wt %) shows that the latter has a reduced crystallinity, an increased N/C ratio, and an improved oxygen reduction catalytic activity compared to the former.

In addition, the high oxygen reduction catalytic activity obtained by using iron and copper in combination was not achieved only by externally doping nitrogen atoms. That is, the carbon catalyst Fe100/Cu0(H)(N) obtained by a nitrogen doping treatment to externally dope nitrogen atoms into the carbon catalyst Fe100/Cu0(H) was found to have a significantly increased N/C ratio compared to the carbon catalyst Fe100/Cu0(H), but the increase in the oxygen reduction-starting potential was not so large.

Meanwhile, the carbon catalysts obtained by using iron and copper and having N/C ratios almost equal to the carbon catalyst Fe100/Cu0(H)(N) (for example, Fe35/Cu65(H), Fe25/Cu75(C900)(H), and Fe25/Cu75(C1000)(H)) exhibited oxygen reduction-starting potential s as high as 0.810 V (vs. NHE) or more.

In addition, also in the carbon catalyst Fe23/Cu63/Co8(H) obtained by using another metal in addition to iron and copper, the effect obtained by using iron and copper in combination was obtained.

In addition, also in the case of using no iron, the carbon catalyst (Co75/Cu25, Co25/Cu75) obtained by using cobalt and copper in combination was found to exert effects such as a reduction in the crystallinity, an increase in the N/C ratio, and increases in the oxygen reduction-starting potential and current density compared to the carbon catalyst Co100/Cu0 obtained by using only cobalt. However, the effects obtained by using iron and copper in combination were significantly higher than the effects obtained by using cobalt and copper in combination.

In addition, the above-mentioned effects obtained by using iron and copper in combination were not obtained by using another transition metal and were peculiar to copper. That is, as shown in FIG. 2, the carbon catalysts obtained by using iron and nickel in combination and by using iron and manganese in combination without using copper (Fe25/Ni75, Fe25/Mn) were found to have reduced oxygen reduction-starting potential s compared to the carbon catalyst Fe100/Cu0(1.25) obtained by using an equal amount of iron alone.

The invention claimed is:

1. A carbon catalyst having a shell-like structure and a crystallinity of from 5.0% to 41.0% as determined by X-ray diffractometry, wherein the carbon catalyst is obtained by carbonizing a raw material, the raw material including:
   an organic substance containing a nitrogen atom; and
   metals, the metals comprising copper and at least one of iron and cobalt,
      wherein a ratio of a content of copper to a total content of copper, iron, and cobalt in the raw material is 10 to 95% by mass.

2. The carbon catalyst according to claim 1, wherein iron is present in the raw material.

3. An electrode, comprising the carbon catalyst according to claim 1.

4. A carbon catalyst, having;
- a crystallinity of from 5.0% to 41.0% as determined by X-ray diffractometry,
- a nitrogen atom-to-carbon atom ratio of 0.7 or more as determined by X-ray photoelectronic spectrometry, and
- an oxygen reduction-starting potential of 0.774 V (vs. NHE) or more.

5. A battery, comprising the electrode according to claim 3.

6. A method of producing a carbon catalyst having a shell-like structure and a crystallinity of from 5.0% to 41.0% as determined by X-ray diffractometry, the method comprising:
- carbonizing a raw material including:
  - an organic substance containing a nitrogen atom, and
  - metals, the metals comprising copper and at least one of iron and cobalt,
    - wherein a ratio of a content of copper to a total content of copper, iron, and cobalt in the raw material is 10 to 95% by mass.

7. The method of producing a carbon catalyst according to claim 6, wherein iron is present in the raw material.

8. An electrode, comprising the carbon catalyst according to claim 2.

9. A battery, comprising the electrode according to claim 8.

10. An electrode, comprising the carbon catalyst according to claim 4.

11. A battery, comprising the electrode according to claim 10.

* * * * *